United States Patent
Pearson et al.

(10) Patent No.: US 11,008,014 B2
(45) Date of Patent: May 18, 2021

(54) METHODS AND APPARATUS TO DETERMINE VEHICLE WEIGHT INFORMATION BASED ON RIDE HEIGHT

(71) Applicant: Ford Global Technologies, LLC, Dearborn, MI (US)

(72) Inventors: Elliot Pearson, Shelby Township, MI (US); Anton Rogness, Dearborn, MI (US); Andrew Niedert, Farmington Hills, MI (US); Joshua Rajasingh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 16/103,635

(22) Filed: Aug. 14, 2018

(65) Prior Publication Data
US 2020/0055521 A1 Feb. 20, 2020

(51) Int. Cl.
*B60W 40/13* (2012.01)

(52) U.S. Cl.
CPC ......... *B60W 40/13* (2013.01); *B60W 2510/18* (2013.01); *B60W 2530/10* (2013.01); *B60W 2530/14* (2013.01); *B60W 2540/18* (2013.01); *B60W 2540/30* (2013.01); *B60W 2555/20* (2020.02)

(58) Field of Classification Search
CPC ............. B60W 40/13; B60W 2555/20; B60W 2540/30; B60W 2530/10; B60W 2510/18; B60W 2540/18; B60W 2530/14; B60W 2040/1307
See application file for complete search history.

(56) References Cited

U.S. PATENT DOCUMENTS

| | | | | |
|---|---|---|---|---|
| 4,935,885 A | * | 6/1990 | McHale | G01G 19/02 |
| | | | | 177/199 |
| 6,567,734 B2 | * | 5/2003 | Bellinger | G01G 19/086 |
| | | | | 701/124 |
| 6,722,669 B1 | * | 4/2004 | Stammreich | B60G 3/26 |
| | | | | 180/425 |
| 6,850,252 B1 | * | 2/2005 | Hoffberg | G06K 9/00369 |
| | | | | 348/E7.061 |

(Continued)

FOREIGN PATENT DOCUMENTS

| | | | | |
|---|---|---|---|---|
| CN | 104169697 A | * | 11/2014 | ......... G01F 23/0076 |
| CN | 104723822 A | * | 6/2015 | ........... B60G 21/007 |

(Continued)

*Primary Examiner* — Behrang Badii
*Assistant Examiner* — Jalal C Coduroglu
(74) *Attorney, Agent, or Firm* — Raymond Coppiellie; Hanley, Flight & Zimmerman, LLC

(57) ABSTRACT

Methods and apparatus to determine vehicle weight information based on ride height are disclosed herein. An example apparatus includes a weight calculator to determine a relationship between ride height information and weight of a vehicle and a compensation calculator to adjust the relationship based on compensation factors and calculate vehicle weight information for the vehicle based on the adjusted relationship, the compensation factors based on vehicle sensor data. The example apparatus further includes a calculation adjustor to adjust the vehicle weight information calculation of the weight calculator or the compensation calculator based on driver behavior.

21 Claims, 6 Drawing Sheets

(56) References Cited

U.S. PATENT DOCUMENTS

| | | | | |
|---|---|---|---|---|
| 6,923,375 B2* | 8/2005 | Stefani | G01G 19/07 | 235/462.01 |
| 7,261,304 B2* | 8/2007 | Trudeau | B60G 17/0155 | 280/5.514 |
| 7,413,063 B1* | 8/2008 | Davis | B60G 17/06 | 188/267.1 |
| 7,660,654 B2* | 2/2010 | Lu | B60T 8/17554 | 280/5.506 |
| 7,661,681 B1* | 2/2010 | Zork | B60G 9/003 | 280/5.514 |
| 7,705,715 B2* | 4/2010 | Hax | G01G 23/3728 | 177/141 |
| 8,103,414 B2* | 1/2012 | Boss | B60W 10/06 | 701/48 |
| 8,188,385 B2* | 5/2012 | Wolfgang | G01G 23/3728 | 177/136 |
| 8,396,627 B2* | 3/2013 | Jung | B60W 40/10 | 701/37 |
| 8,825,587 B2* | 9/2014 | Rosenberg | G06Q 30/02 | 706/52 |
| 9,290,231 B1* | 3/2016 | Jurrens | F16F 9/088 | |
| 9,310,242 B2* | 4/2016 | Kammann | B60T 8/1725 | |
| 9,330,630 B2* | 5/2016 | Kerofsky | G09G 3/3406 | |
| 9,347,845 B2* | 5/2016 | Giessibl | G01L 1/125 | |
| 9,643,466 B1* | 5/2017 | Christoff | B60G 3/20 | |
| 10,473,515 B2* | 11/2019 | Imagawa | G01B 11/14 | |
| 2005/0192727 A1* | 9/2005 | Shostak | B60C 23/041 | 701/37 |
| 2005/0288850 A1* | 12/2005 | Sato | F02D 41/00 | 701/123 |
| 2006/0064218 A1* | 3/2006 | Subbian | B60R 21/0132 | 701/45 |
| 2006/0071441 A1* | 4/2006 | Mathis | B60G 11/16 | 280/124.128 |
| 2006/0181034 A1* | 8/2006 | Wilde | B60G 17/0165 | 280/5.515 |
| 2007/0050101 A1* | 3/2007 | Sacle | B64D 45/0031 | 701/11 |
| 2009/0242720 A1* | 10/2009 | Charters | B60S 11/00 | 248/352 |
| 2009/0248221 A1* | 10/2009 | O'Neal | B60W 30/184 | 701/2 |
| 2009/0276267 A1* | 11/2009 | Padan | G06Q 10/02 | 705/5 |
| 2010/0222943 A1* | 9/2010 | Sghairi | B64C 13/503 | 701/4 |
| 2011/0036646 A1* | 2/2011 | Dack | G01G 19/10 | 177/136 |
| 2011/0093239 A1* | 4/2011 | Holbrook | G01G 19/10 | 702/174 |
| 2011/0118906 A1* | 5/2011 | Fervel | B64C 13/503 | 701/3 |
| 2012/0069131 A1* | 3/2012 | Abelow | G06Q 10/067 | 348/14.01 |
| 2013/0057399 A1* | 3/2013 | Panse | B60G 17/017 | 340/440 |
| 2014/0100718 A1* | 4/2014 | Brot | G05D 1/0077 | 701/3 |
| 2014/0195113 A1* | 7/2014 | Lu | B60G 17/018 | 701/37 |
| 2014/0291085 A1* | 10/2014 | Bandy | F16F 9/006 | 188/269 |
| 2014/0306415 A1* | 10/2014 | Aldrich | B60G 9/022 | 280/124.116 |
| 2015/0142356 A1* | 5/2015 | Thomas | G01B 7/10 | 702/65 |
| 2015/0197130 A1* | 7/2015 | Smith | B60G 17/0155 | 280/124.175 |
| 2015/0241295 A1* | 8/2015 | Fuscone | B64D 45/00 | 701/124 |
| 2016/0075333 A1* | 3/2016 | Sujan | B60W 10/02 | 701/25 |
| 2016/0082964 A1* | 3/2016 | Chunodkar | B60W 40/076 | 701/70 |
| 2016/0116273 A1* | 4/2016 | Voeller | G01M 17/007 | 702/94 |
| 2016/0207505 A1* | 7/2016 | Lehman | B60S 9/10 | |
| 2016/0257355 A1* | 9/2016 | Siuchta | B60W 40/13 | |
| 2017/0021812 A1* | 1/2017 | Sugano | B60W 40/08 | |
| 2017/0113745 A1* | 4/2017 | Cook | B62D 53/04 | |
| 2017/0120712 A1* | 5/2017 | Coombs | B60G 17/0526 | |
| 2017/0137023 A1* | 5/2017 | Anderson | B60W 50/14 | |
| 2017/0235848 A1* | 8/2017 | Van Dusen | G06F 16/904 | 705/12 |
| 2017/0243485 A1* | 8/2017 | Rubin | H04W 4/026 | |
| 2017/0269594 A1* | 9/2017 | Sydnor | B64C 39/024 | |
| 2017/0315014 A1* | 11/2017 | Regan | G01M 1/125 | |
| 2017/0361868 A1* | 12/2017 | Guy | B60W 40/02 | |
| 2018/0045556 A1* | 2/2018 | Imagawa | G01B 11/14 | |
| 2018/0180444 A1* | 6/2018 | Cantaloube | G01C 23/005 | |
| 2018/0290730 A1* | 10/2018 | Brot | G05B 19/02 | |
| 2019/0212223 A1* | 7/2019 | Kusaka | G01M 5/0008 | |
| 2019/0337523 A1* | 11/2019 | Rogness | G01G 19/08 | |
| 2019/0337529 A1* | 11/2019 | Niedert | B60R 25/04 | |
| 2020/0041329 A1* | 2/2020 | Shike | B60P 1/04 | |
| 2020/0048843 A1* | 2/2020 | Kelly | E01C 19/008 | |
| 2020/0055521 A1* | 2/2020 | Pearson | B60W 40/13 | |
| 2020/0117899 A1* | 4/2020 | Rogness | G01G 19/12 | |

FOREIGN PATENT DOCUMENTS

| | | | | |
|---|---|---|---|---|
| DE | 102006045305 B3 * | 1/2008 | | B60W 40/13 |
| DE | 102007015356 A1 * | 10/2008 | | B60W 40/13 |
| DE | 102008026825 | 12/2009 | | |
| DE | 102011004028 A1 * | 8/2012 | | G01G 19/08 |
| DE | 102014001031 | 7/2015 | | |
| EP | 2717108 A1 * | 4/2014 | | G05D 1/0077 |
| EP | 2793009 A1 * | 10/2014 | | G01N 27/72 |
| FR | 3052726 B1 * | 7/2018 | | B60W 30/18118 |
| GB | 2421088 A * | 6/2006 | | B60W 30/04 |
| WO | WO-9424844 A1 * | 11/1994 | | G05B 13/024 |
| WO | WO-0028236 A1 * | 5/2000 | | B60G 17/0408 |
| WO | WO-0201148 A2 * | 1/2002 | | G01B 11/2755 |
| WO | WO-02081278 A1 * | 10/2002 | | B60T 8/1725 |
| WO | WO-2006079793 A1 * | 8/2006 | | G01D 5/2046 |
| WO | WO-2010052725 A2 * | 5/2010 | | H05B 6/664 |
| WO | WO-2012073760 A1 * | 6/2012 | | B62D 6/008 |
| WO | WO-2013069087 A1 * | 5/2013 | | H03F 1/3247 |
| WO | WO-2013115240 A1 * | 8/2013 | | H02P 21/02 |
| WO | WO-2014050382 A1 * | 4/2014 | | H04B 1/26 |
| WO | WO-2016075899 A1 * | 5/2016 | | B60T 8/171 |
| WO | WO-2018065551 A1 * | 4/2018 | | E01C 19/008 |
| WO | 20180171937 | 9/2018 | | |

* cited by examiner

METHODS AND APPARATUS TO DETERMINE VEHICLE WEIGHT INFORMATION BASED ON RIDE HEIGHT

FIELD OF THE DISCLOSURE

This disclosure relates generally to vehicle weight and, more particularly, to methods and apparatus to determine vehicle weight information based on ride height.

BACKGROUND

Drivers desire to know vehicle weight and/or vehicle weight distribution of a vehicle to improve loading practices and vehicle handling. Vehicle and/or trailer weight and weight distribution information indicates when a vehicle is overloaded, a quantity of material being hauled, how the weight is distributed (e.g., between left and right sides of the vehicle), rate at which materials are being removed from the vehicle, how much more material can be carried by the vehicle, and/or other information that the driver desires when hauling materials. Additionally, the knowledge provided to the driver by the weight and weight distribution information reduces instances of trailer sway, handling degradation, decreased stopping distance, decreased steering performance, and other reductions in driving performance.

Figure 1:
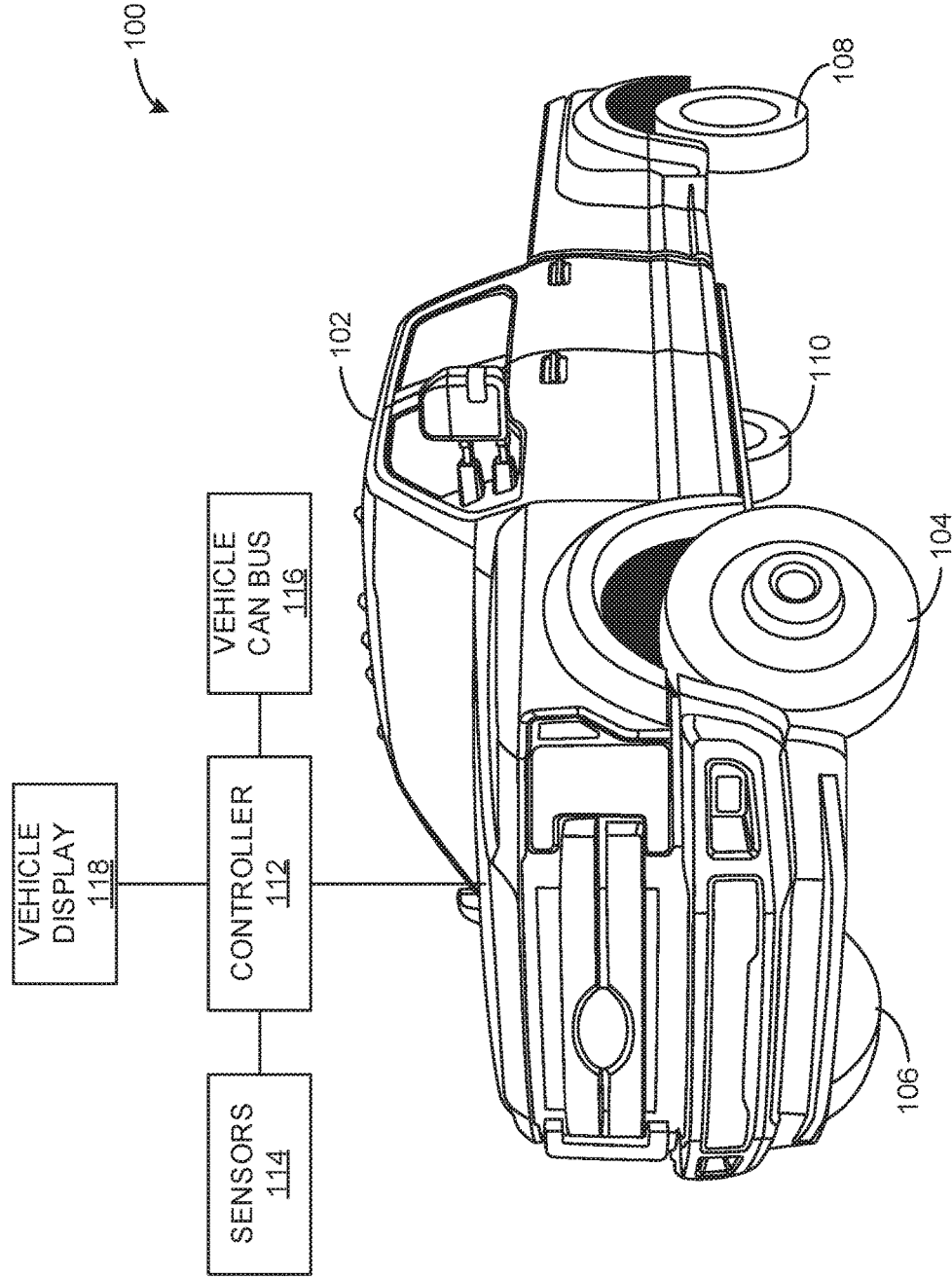
FIG. 1 represents an example environment in which the apparatus and methods disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Previous methods of determining vehicle and/or trailer weight and weight distribution did not adequately account for vehicle characteristics, driving behavior, external conditions, and/or other factors that affect weight and weight distribution calculations. For example, previous methods did not account for changes in suspension components (e.g., spring, damping, and/or bushing characteristics) over time (e.g., degradation of the components). Further, environmental factors (e.g., temperature, humidity, etc.) were not factored into previous methods for determining a relationship between suspension compression and applied force (e.g., due to weight). Several other factors, including condition and/or orientation of a driving surface and/or load sharing between wheels were not considered in previous weight and weight distribution calculations. These factors often strongly influence vehicle weight measurements calculated based on ride height. As a result, these weight measurements can be inaccurate if these factors are not considered.

Example methods and apparatus disclosed herein calculate weight information for a vehicle and/or a trailer based on ride height information (e.g., from ride height sensors). The examples disclosed herein further consider the aforementioned factors that cause changes in a relationship between ride height and weight and/or weight distribution. Such examples utilize on-board vehicle sensors (e.g., tire pressure sensors, steering angle sensors, sensors in an anti-lock braking (ABS) system, etc.) to adjust the relationship between ride height and weight and/or calculations of weight information. In some examples disclosed herein, the calculations of the weight information are continuously adjusted based on driving behavior. For example, when a driver frequently drives on off-road driving surfaces, the calculation is adjusted to weight compensation factors related to driving surface conditions (e.g., contact grade, contact roll, local bump or pitfall, etc.) more heavily. Thus, the examples disclosed herein provide accurate vehicle information to a driver of the vehicle and continuously improve the calculations throughout the life of the vehicle.

FIG. 1 represents an example environment 100 in which the apparatus and methods disclosed herein may be implemented. The example environment 100 includes an example vehicle 102. The vehicle 102 of the illustrated example is a truck. In some examples, the vehicle 102 is a car (e.g., a sedan), motorcycle, and/or any other vehicle having a suspension system. The vehicle 102 may be a body-on-frame construction or unibody construction. In some examples, the vehicle 102 tows a trailer (not shown). In some examples, the methods and apparatus disclosed herein calculate weight information for the trailer.

The vehicle 102 of the illustrated example includes front wheels 104, 106 supported by a front suspension and rear wheels 108, 110 supported by a rear suspension. The front suspension associated with the front wheels 104, 106 provides steerability to the front wheels 104, 106. Likewise, the rear suspension associated with the rear wheels 108, 110 can provide steerability to the rear wheels 108, 110. The example teachings of this disclosure may be implemented with any type of suspension (e.g., a steerable suspension, a non-steerable suspension) and/or any other types of vehicles.

In the illustrated example, the vehicle 102 includes a controller 112. The controller 112 receives information from systems of the vehicle 102 (e.g., a suspension system, powertrain, engine, etc.) and determines vehicle weight information. As used herein, vehicle weight information includes any weight calculations and/or weight distribution calculations related to a vehicle and/or a trailer of a vehicle. For example, the controller 112 can calculate vehicle weight information that includes total vehicle weight, front axle weight, rear axle weight, cargo weight, passenger weight, fuel weight, wheel-end force, trailer coupler weight, and/or trailer weight.

The controller 112 of the illustrated example is communicatively coupled to sensors 114 and a vehicle controller area network (CAN) bus 116. In some examples, the sensors 114 include ride height sensors (e.g., a ride height sensor associated with each wheel end of the vehicle 102). In some examples, the sensors 114 include other sensors that obtain data associated with the vehicle 102. The vehicle CAN bus 116 obtains data from systems of the vehicle 102 and provides the data to the controller 112. For example, the vehicle CAN bus 116 can transmit tire pressure data, steering angle data, wheel speed data, temperature data, and/or data from any system of the vehicle 102 (e.g., powertrain, anti-lock braking system, etc.).

The controller 112 is further communicatively coupled to an example vehicle display 118. The vehicle display 118 displays information output by the controller 112 (e.g., total vehicle weight, front axle weight, trailer weight, etc.) to a driver of the vehicle 102. In some examples, the vehicle display 118 displays warnings and/or alerts to the driver when the vehicle 102 is subjected to predetermined conditions (e.g., total weight exceeds a threshold, trailer coupler weight exceeds a threshold, etc.). In some such examples, the vehicle display 118 requests interaction from the driver of the vehicle 102 (e.g., pressing a button, entering a command, etc.). Additionally or alternatively, the vehicle display 118 can receive input from the driver of the vehicle 102 (e.g., requesting information, resetting weight information output, etc.).

Figure 2:
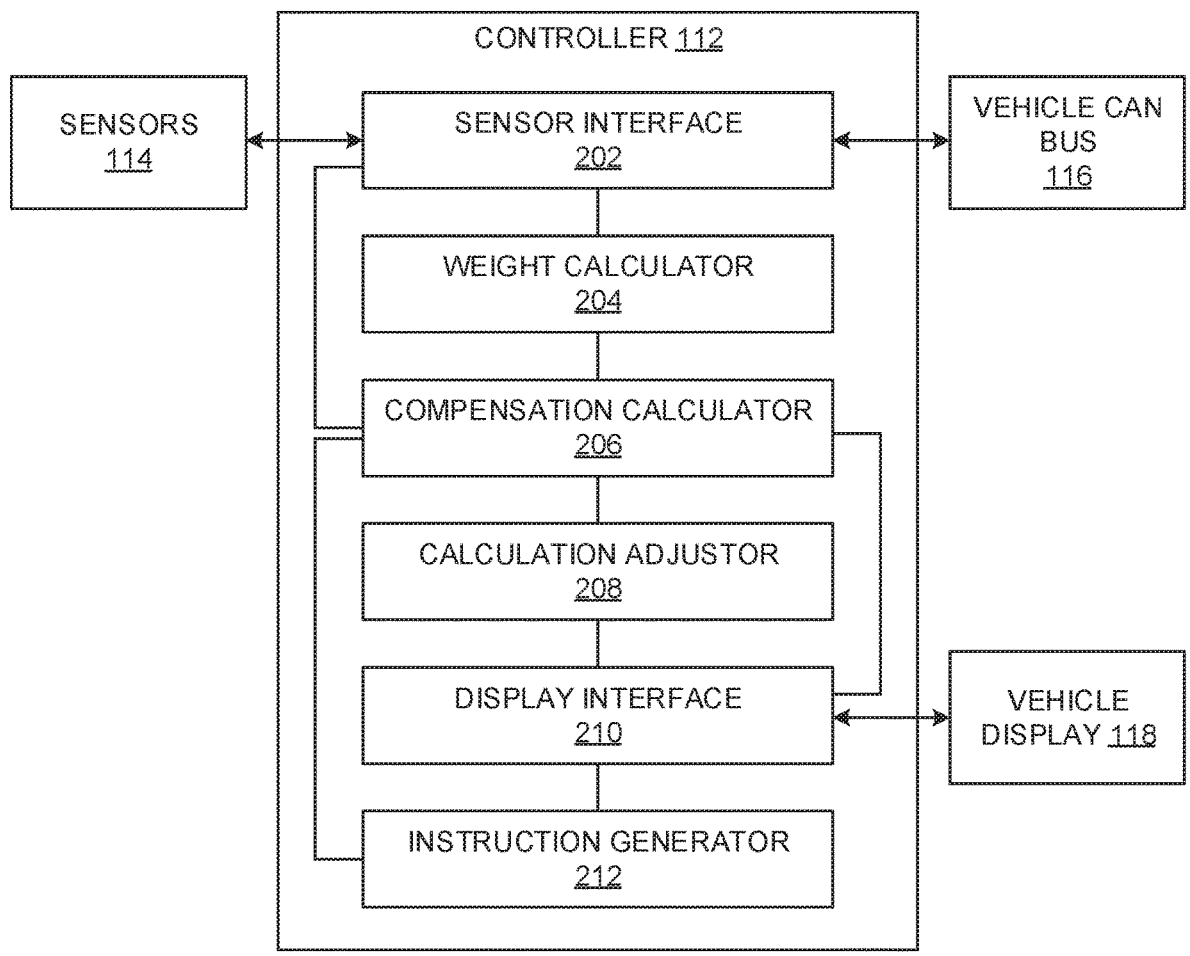
FIG. 2 is a block diagram of the example controller of FIG. 1.

FIG. 2 is a block diagram of the example controller 112 of FIG. 1. The example controller 112 includes an example sensor interface 202, an example weight calculator 204, an example compensation calculator 206, an example calculation adjustor 208, an example display interface 210, and an example instruction generator 212.

In operation, the sensor interface 202 is communicatively coupled to the example sensors 114 and vehicle controller area network (CAN) bus of FIG. 1. The sensor interface 202 receives sensor data from the sensors 114 and the vehicle CAN bus 116. For example, the sensor interface 202 receives ride height sensor data from the sensors 114. In some examples, the sensors are rotary suspension height sensors. Additionally or alternatively, the ride height associated with wheel-ends of the wheels of the vehicle 102 (e.g., wheels 104-110) can be measured by linear shock sensors.

The vehicle CAN bus 116 stores sensor data from additional systems of the vehicle 102. For example, the vehicle CAN bus 116 can store data associated with an anti-lock braking system (e.g., wheel speed data, tire pressure data, etc.), a steering system (e.g., steering angle data), and/or data from any other systems of the vehicle 102 (e.g., temperature data, humidity data, etc.).

The sensor interface 202 is communicatively coupled to the weight calculator 204 and transmits sensor data to the weight calculator 204. The weight calculator 204 uses the data to determine a relationship between ride height data (e.g., an output voltage from ride height sensors) and weight (e.g., based on a force) at a wheel-end of the vehicle 102 (e.g., at one or more of the wheels 104-110). The weight calculator 204 determines the relationship between ride height and weight using one of two approaches: a component-level approach and a vehicle-level approach. In some examples, the component-level approach and/or the vehicle-level approach utilize build parameters to develop the relationship. As used herein, build parameters are characteristics of vehicle components that are specific to a make and model of a vehicle. In some examples, the build parameters are consistent across all vehicles of the same make and model.

When the weight calculator 204 determines the relationship using the component-level approach, the relationship between ride height and weight depends on a geometry of the suspension and/or properties of suspension components. For example, information is known about specific components of the suspension, such as springs, bushings, dampers, and/or control arms. In some examples, the known information is a rate (e.g., a spring rate, a bushing rate, etc.) and/or hysteresis curves for the components. In some examples, the relationship of ride height and weight further depends on ride height sensor linkage geometry (e.g., a rotary suspension height sensor, a linear shock position sensor, etc.). The weight calculator 204 uses the properties of individual components of the suspension to develop the relationship between ride height and weight. In some examples, the relationship is an equation (e.g., weight as a function of ride height). Additionally or alternatively, the relationship can be a look-up table (e.g., returning a weight from the table based on a ride height input).

When the weight calculator 204 uses the vehicle-level approach, the weight calculator 204 determines the relationship based on measured ride heights (e.g., changes in ride height) at corners of the vehicle 102 when forces are applied to various locations on the vehicle 102. For example, predetermined forces can be applied at the front of the vehicle 102, the rear of the vehicle 102, in the bed of the vehicle 102, etc. and ride heights at each corner of the vehicle 102 can be measured. The measured data is then used to develop a relationship between ride height and weight. In some examples, the relationship is developed as an equation. Additionally or alternatively, the relationship can be in the form of a look-up table.

When the relationship between ride height and weight is established, the weight calculator 204 enables calculation of a weight value associated with each wheel-end (e.g., at each wheel 104-110 of the vehicle 102). Several methods for calculating the weight can be implemented by the weight calculator 204. In some examples, the weight calculator 204 uses a polynomial matching equation, wherein the weight calculator 204 determines a polynomial (e.g., a fifth order polynomial, a sixth order polynomial, etc.) with coefficients based on, for example, the component-level approach above. For example, the weight calculator 204 can develop the following example polynomial equation (Equation 1) to relate ride height and weight:

$$A = B^*(\text{rideheight}_{FL})^6 + C^*(\text{rideheight}_{FL})^5 + \ldots + D^*(\text{rideheight}_{FL})^1 + E^*(\text{rideheight}_{FL})^0 \quad \text{(Equation 1)}$$

where $\text{rideheight}_{FL}$ is a ride height value for a front left wheel of the vehicle 102, A is a weight at the wheel-end associated with the front left wheel of the vehicle 102, and B, C, D, and E are coefficients determined by the weight calculator 204 (e.g., based on the vehicle-level approach, the component-level approach, etc.). Equation 1 can further be applied to any other wheel-ends of the vehicle 102. In an example implementation of Equation 1, the total weight (e.g., an uncompensated weight of the vehicle 102) is calculated by using Equation 1 for four wheel-end ride height sensors and algebraically combining the weight associated with each wheel-end.

In some examples, the weight calculator 204 uses a piecewise linear equation to enable calculation of the weight at each wheel-end of the vehicle 102 (e.g., created using the vehicle-level approach above). For example, the weight calculator 204 establishes a unique equation for the weight based on ride height for one or more ranges of ride height (e.g., a first equation for ride heights between 0 and 50 mm, a second equation for ride heights above 50 mm up to 75 mm, etc.). An example piecewise linear equation (Equation 2) developed by the weight calculator 204 relates ride height and weight:

$$\begin{cases} f_1(\text{weight}_{FL}) = A*(\text{rideheight}_{FL})^1 + B*(\text{rideheight}_{FL})^0 \\ f_2(\text{weight}_{FL}) = C*(\text{rideheight}_{FL})^1 + D*(\text{rideheight}_{FL})^0 \\ f_1(\text{weight}_{FL}) = E*(\text{rideheight}_{FL})^1 + F*(\text{rideheight}_{FL})^0 \end{cases} \quad \text{(Equation 2)}$$

where rideheight$_{FL}$ is the ride height measured at the front left wheel-end, $f_1$ is an equation to calculate weight at the front left wheel-end of the vehicle 102 for a first range of ride height values (e.g., less than 65 mm), $f_2$ is an equation to calculate weight at the front left wheel-end of the vehicle 102 for a second range of ride height values (e.g., 65 mm to 80 mm), $f_3$ is an equation to calculate weight at the front left wheel-end of the vehicle 102 for a third range of ride height values (e.g., above 80 mm), and A, B, C, D, E, and F are coefficients determined by the weight calculator 204 (e.g., using the vehicle-level approach). Additionally or alternatively, the weight calculator 204 can use a look-up table to enable the weight associated with each wheel-end of the vehicle 102 to be determined (e.g., using the component-level approach or the vehicle-level approach).

The weight calculator 204 of the illustrated example uses the relationship between ride height and weight to enable calculations of weight associated with each wheel-end of the vehicle 102 (e.g., associated with each of the wheels 104-110). Further, the relationship developed by the weight calculator 204 enables the calculation of total vehicle weight, front axle weight, rear axle weight, cargo weight, passenger weight, fuel weight, wheel-end force, trailer coupler weight, and/or trailer weight. For example, the total vehicle weight can be calculated by combining all of the weights (e.g., one for each wheel-end of the vehicle 102). In another example, the front axle weight can be calculated based on a combination of the weights associated with the front suspension (e.g., the weight associated with the front wheels 104, 106). Similarly, the rear axle weight can be calculated, for example, by combining the weights associated with the rear suspension.

When the weight calculator 204 has determined the relationship between ride height and weight, the relationship is output to the compensation calculator 206. The compensation calculator 206 further receives sensor data from the sensor interface 202. In some examples, the sensor data is the data received by the sensor interface 202 by the vehicle CAN bus 116. The compensation calculator 206 calculates compensation factors to be applied to the relationship. The compensation factors calculated by the compensation calculator 206 adjust the relationship developed by the weight calculator 204 to account for conditions that influence the weight information calculations, including driving surface characteristics (e.g., grade), external factors (e.g., temperature, humidity, etc.), load sharing characteristics (e.g., anti-roll bar characteristics), driving characteristics (e.g., steering angle, fuel level, etc.), and/or vehicle lifecycle (e.g., vehicle age). Specific compensation factors are discussed in more detail in connection with FIG. 3.

In some examples, the compensation calculator 206 calculates all compensation factors and applies each of the compensation factors to the relationship. Additionally or alternatively, the compensation calculator 206 can determine specific compensation factors that are to be applied to the relationship. When the compensation calculator 206 has calculated the compensation factors, the compensation calculator 206 applies the compensation factors to the relationship received from the weight calculator 204. In some examples, the one or more compensation factors are combined with coefficients used in an equation (e.g., an equation representing the relationship).

When the compensation calculator 206 has updated the relationship (e.g., by applying the compensation factors), the weight information can be calculated based on the updated relationship. For example, the compensation calculator 206 can adjust the ride height to weight relationship and calculate a weight associated with each wheel-end of the vehicle 102. The weight associated with each wheel-end can be combined to calculate the weight information (e.g., including total vehicle weight, front axle weight, etc.). The weight information is further output to the calculation adjustor 208 and the display interface 210. The calculation adjustor 208 serves to adjust the calculations performed by the weight calculator 204 and/or the compensation calculator 206. In some examples, the calculation adjustor 208 determines the adjustments to the weight calculator 204 and/or the compensation calculator 206 based on machine-learning techniques. The calculation adjustor 208 of the illustrated example determines adjustments based on a comparison of the weight information to weight estimations created by other systems of the vehicle 102 and/or driver behavior. Additionally or alternatively, the calculation adjustor 208 can adjust the functions of the weight calculator 204 and/or the compensation calculator 206 based on other criteria (e.g., degradation of vehicle systems over time).

The calculation adjustor 208, in some examples, compares the weight information calculated by the weight calculator 204 and the compensation calculator 206 to weight calculations from other systems of the vehicle 102. For example, the weight information can be compared to a weight estimation calculated by the anti-lock braking system or the powertrain system of the vehicle 102 (e.g., a dynamic weight estimation). Based on the comparison, the calculation adjustor 208 determines the accuracy of the weight information. If the weight information does not show significant variation (e.g., the weight information is within a threshold of a weight estimation from another system of the vehicle 102), for example, the calculation adjustor 208 does not adjust the calculations of the weight calculator 204 or the compensation calculator (e.g., the weight information is calculated the same way in subsequent calculations). On the other hand, the calculation adjustor 208 determines an adjustment to the weight calculator 204 and/or the compensation calculator 206 when the weight information varies outside of an acceptable limit of the weight estimation of another system.

To adjust the weight calculator 204, the calculation adjustor 208 determines a component or components of the weight calculator 204 calculation (e.g., a coefficient) that is to be adjusted. For example, the calculation adjustor 208 can adjust the coefficients of an equation developed to determine weight based on ride height (e.g., an equation by the weight calculator 204 using the component-level or vehicle-level approach). In another example, the calculation adjustor 208 adjusts the method of developing the relationship between ride height and weight (e.g., changing from a component-level approach to a vehicle-level approach).

To adjust the calculations of the compensation calculator 206, the calculation adjustor 208 determines one or more compensation factors to adjust. For example, the calculation adjustor 208 can determine that a compensation factor should be weighted more heavily when applied to the relationship between ride height and weight by the compensation calculator 206. In another example, the calculation adjustor 208 determines an adjustment to the calculation of the compensation factors (e.g., weighting of sensor data, sensor data used in the calculations, etc.).

In some examples, the calculation adjustor 208 uses driver behavior to determine the adjustments to the compensation calculator 206. In some examples, driver behavior includes terrain that the driver frequently (e.g., regularly, daily, weekly, etc.) drives on, tasks the driver frequently (e.g., regularly, daily, weekly, etc.) uses the vehicle 102 for, and/or weather conditions that the driver uses and/or stores the vehicle 102 in. For example, the calculation adjustor 208 can determine that a driver of the vehicle 102 often drives on off-road terrain. In such an example, the calculation adjustor 208 is able to determine that the driving conditions precipitate changes in the weight information and, thus, adjusts the compensation calculator 206 to weight particular compensation factors, such as a contact grade compensation factor, a contact roll compensation factor, and/or a local bump compensation factor, more heavily. In some examples, the calculation adjustor 208 determines that a driver often hauls a trailer and/or heavy materials. In such an example, the calculation adjustor 208 adjusts the compensation calculator 206 to weight compensation factors, such as vehicle lifecycle compensation factors, more heavily. Further, an example adjustment can be made to the compensation calculator 206 by the calculation adjustor 208 when the vehicle 102 is often left in hot and/or dry conditions (e.g., left outside all day in the sun). In such an example, the calculation adjustor 208 adjusts the compensation calculator 206 to give more weight to environmental compensation factors (e.g., a temperature compensation factor and/or a humidity compensation factor).

In some examples, the calculation adjustor 208 determines adjustments to the weight calculator 204 based on system degradation over time. For example, when the calculation adjustor 208 determines that the weight information is inaccurate, even after calculating a vehicle linear age compensation factor, the calculation adjustor 208 can analyze how heavily the vehicle 102 is utilized over a given time interval to adjust the relationship of ride height and weight developed by the weight calculator 204. For example, the calculation adjustor 208 can adjust the relationship (e.g., an equation) created using the component-level approach if the vehicle 102 has been used heavily over a short duration. In such an example, the calculation adjustor 208 can adjust the parameters of the equation to accurately account for changes of suspension components (e.g., springs, bushings, etc.) due to the high vehicle usage.

In some examples, several adjustments are made by the calculation adjustor 208 simultaneously to the weight calculator 204 and/or the compensation calculator 206. The calculation adjustor 208 can further verify previous adjustments to the weight calculator 204 and/or the compensation calculator 206 once new weight information has been generated. If the results (e.g., new weight information) are compared to other weight estimations (e.g., from the powertrain) and are deemed inaccurate (e.g., equally as inaccurate or more inaccurate than before), further adjustments can be made. The calculation adjustor 208 continues to improve the calculations performed by the weight calculator 204 and/or the compensation calculator 206 throughout operation of the controller 112.

In the illustrated example, the display interface 210 is communicatively coupled to the example vehicle display 118 of FIG. 1. The display interface 210 receives the weight information from the compensation calculator 206 and transmits the weight information to the vehicle display 118. A driver of the vehicle 102 can thus view the weight information to assess the weight of the vehicle, weight of cargo, weight distribution (e.g., in a bed of a truck), weight of a trailer, and/or other weight information of interest to the driver. As the weight calculator 204 and compensation calculator 206 continuously calculate and update the weight information (e.g., new calculations every 100 milliseconds, etc.), the display interface 210 transmits the weight information to the vehicle display 118 to maintain updated weight information. Accordingly, the driver of the vehicle 102 has a constant stream of accurate weight information displayed via the vehicle display 118. In some examples, the driver selects specific components of the weight information to be displayed by inputting commands into the vehicle display 118.

The driver of the vehicle 102 can use the weight information in several different cases. For example, the customer can determine when the vehicle 102 is overloaded or nearly overloaded. In some examples, the vehicle display 118 can display a message or alert to the driver when the vehicle 102 is nearly overloaded (e.g., within a threshold of a maximum allowable weight). Additionally or alternatively, the vehicle display 118 can show the driver when the weight passes a predetermined weight threshold (e.g., via an alert, message, sound, etc.). In another example, the driver can determine an amount of cargo that is in the vehicle 102. In yet another example, the driver can determine a fixed amount of additional cargo that the vehicle 102 can carry (e.g., by comparing current total weight to a maximum carrying capacity of the vehicle 102).

In yet another example, the driver can determine a weight distribution carried by the vehicle 102. In a further example, the driver can determine how to load the vehicle 102 to improve the weight distribution. In yet another example, the driver can use the methods and apparatus disclosed herein to weigh an object by placing it in the vehicle 102 (e.g., to determine if an amount of material is enough for a job). In yet another example, the driver can determine a rate at which material is being removed from the vehicle. For example, if the driver is dumping material (e.g., salt, gravel, etc.) from the vehicle 102 while driving, the vehicle display 118 can display a rate that the weight is decreasing and/or how much material is left in the vehicle 102.

The compensation calculator 206 is further communicatively coupled to the instruction generator 212. The instruction generator 212 uses the weight information calculated by the weight calculator 204 and/or the compensation calculator 206 to determine adjustments to other vehicle systems (e.g., a transmission, anti-lock braking system (ABS), etc.). The instruction generator 212 further transmits instructions to the other vehicle systems to adjust parameters and/or functions of the systems. For example, the instruction generator 212 can transmit instructions to a vehicle transmission to adjust shift points, which are dependent in part on vehicle weight. The transmission of the vehicle 102 will then shift between gears at different flywheel rpms to maximize effective usage of torque without compromising fuel efficiency. In another example, the instruction generator 212 transmits instructions to the ABS of the vehicle 102 to adjust an amount of braking force to be applied at each corner of the vehicle 102. The adjustment is based on the weight information (e.g., vehicle weight, vehicle weight distribution, etc.) because the amount of braking force is dependent on inertia of the vehicle 102. In yet another example, the instruction generator 212 transmits instructions, based on the weight information, to a cruise control system of the vehicle 102 while the vehicle 102 descends a hill. Such instructions (e.g., an amount of braking force to be applied at each wheel of the vehicle 102) allows the vehicle 102 to descend the hill while maintaining a constant speed and applies braking forces more evenly.

The instruction generator 212 can further determine adjustments to system calculations, such as an electric vehicle range estimation (e.g., a number of miles the vehicle 102 can be driven before charging is needed). The electric vehicle range estimation is dependent on vehicle weight (e.g., a lighter vehicle can travel farther), and the weight information output by the compensation calculator 206 can be used to provide adjustments to improve the accuracy of the electric vehicle range estimation. In another example, the instruction generator 212 determines a recommended tire pressure based on the weight information. In some examples, the instruction generator 212 is communicatively coupled to the display interface 210. In some such examples, the instruction generator 212 outputs the recommended tire pressure to the display interface 210 to be presented to the driver of the vehicle 102 via the vehicle display 118. In another example, the instruction generator 212 determines prognostic information based on the weight information, such as suspension health (e.g., when suspension components, such as springs, dampers, and bushings, should be replaced) to the display interface 210. The display interface 210 then transmits the prognostic information to the vehicle display 118.

Figure 3:
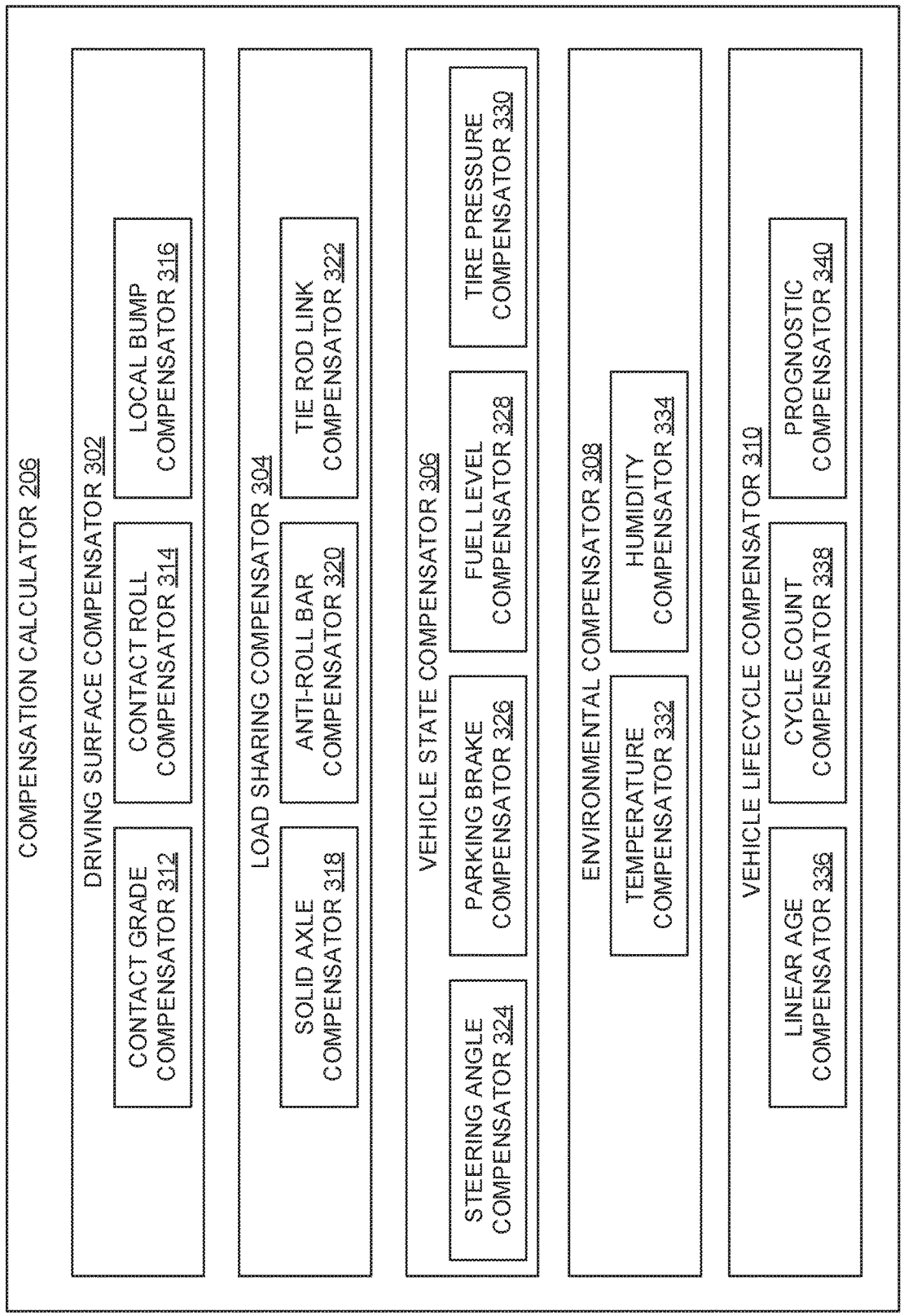
FIG. 3 is a block diagram of the example compensation calculator of FIG. 2.

FIG. 3 is a block diagram of the example compensation calculator 206 of FIG. 2. The compensation calculator 206 of the illustrated example includes an example driving surface compensator 302, an example load sharing compensator 304, an example vehicle state compensator 306, an example environmental compensator 308, and an example vehicle lifecycle compensator 310. Each of the driving surface compensator 302, the load sharing compensator 304, the vehicle state compensator 306, the environmental compensator 308, and the vehicle lifecycle compensator 310 is composed of multiple compensators that use sensor data (e.g., from the vehicle CAN bus 116 of FIGS. 1 and/or 2) to calculate a compensation factor to be applied to the relationship between ride height and weight. However, in some examples, additional and/or alternative compensators are included within the compensators 302-310 to calculate compensation factors to be applied to the relationship developed by the example weight calculator 204 of FIG. 2

The driving surface compensator 302 of the illustrated example includes an example contact grade compensator 312, an example contact roll compensator 314, and an example local bump compensator 316. In operation, the driving surface compensator 302 functions to adjust the relationship developed by the weight calculator 204 based on conditions of a driving surface (e.g., a road, off-road terrain, a hill, etc.). The contact grade compensator 312 calculates a compensation factor based on a grade of the driving surface (e.g., as a percentage). In some examples, the contact grade compensator 312 accounts for an uneven weight distribution based on the grade. For example, when the vehicle 102 of FIG. 1 is parked on a hill (e.g., uphill or downhill), weight distribution between front and rear axles of the vehicle 102 varies based on an angle of incline. Thus, the contact grade compensator 312 calculates a compensation factor based on conditions that depend on grade, such as vehicle frame twist, vehicle suspension arc, and/or vehicle body motion. An example equation (Equation 3) shows a calculation of a corrected rear weight used by the contact grade compensator 312:

$$\text{Weight}_{rear,corr} = \text{Weight}_{rear} * (a * \cos\theta_g b) c \quad \text{(Equation 3)}$$

where $\text{Weight}_{rear,corr}$ is a corrected weight of rear wheel-ends (e.g., associated with the rear left wheel 108 and the rear right wheel 110 of FIG. 1), $\text{Weight}_{rear}$ is the original weight calculated at these wheel-ends, a, b, and c are vehicle-specific parameters (e.g., build parameters) that result from conditions such as frame twist, suspension arc, and/or vehicle body motion, and $\theta_g$ is an angle of the grade the vehicle 102 is on. Using Equation 3, the contact grade compensator 312 can modify the relationship between ride height and weight based on an angle associated with the grade of the driving surface. In some examples, the contact grade compensator 312 uses data from an accelerometer on the vehicle 102 used to measure vehicle pitch to calculate the compensation factor.

The contact roll compensator 314 calculates a compensation factor based on a gradient between left and right sides of the vehicle 102. For example, when the vehicle 102 is parked on a surface that is higher on one side of the vehicle 102 than the other side of the vehicle 102, a compensation factor is calculated by the contact roll compensator 314 based on a roll angle (e.g., a cosine of the roll angle). In some examples, the contact roll compensator 314 uses conditions such as vehicle frame twist, vehicle suspension arc, and/or vehicle body motion in the compensation factor calculation. For example, the contact roll compensator 314 can use the following equation (Equation 4) to adjust the relationship of ride height and weight:

$$\text{Weight}_{right,corr} = \text{Weight}_{right} * (d * \cos\theta_r + e) + f \quad \text{(Equation 4)}$$

where $\text{Weight}_{right,corr}$ is a corrected weight of right wheel-ends (e.g., associated with the front right wheel 106 and the rear right wheel 110 of FIG. 1), $\text{Weight}_{right}$ is the original weight calculated at these wheel-ends, d, e, and f are vehicle-specific parameters (e.g., build parameters) that result from conditions such as frame twist, suspension arc, and/or vehicle body motion, and $\theta_r$ is an angle of the left-right gradient of the driving surface. Equation 4 can further be modified to calculate a corrected weight at the left wheel-ends by using weights at the left wheel-ends and an angle measuring a right-left gradient of the driving surface. In some examples, the contact roll compensator 314 receives sensor data from an accelerometer on the vehicle 102 that measures vehicle roll.

The local bump compensator 316 calculates a compensation factor that compensates for instances where the vehicle 102 is parked with a wheel out-of-plane from the other wheels (e.g., a wheel is on a curb, in a pothole, etc.). For example, the local bump compensator 316 estimates a wheel height based on heights of the other wheels and compares the estimated height with a measured height. An example equation (Equation 5) implemented by the local bump compensator 316 can be used to calculate the estimated height of a potentially out-of-plane wheel:

$$Z = \frac{((E-B)*(I-F)-(F-C)*(H-E))*(X-A)+((F-C)*(G-D)-(D-A)*(I-F))*(Y-B)}{-((D-A)*(H-E)-(E-B)*(G-D))}+C \quad \text{(Equation 5)}$$

where Z is the estimated height, A, B, and C are spatial coordinates (e.g., X, Y, and Z coordinates) of a first wheel (e.g., a wheel used to generate a plane), D, E, and F are spatial coordinates of a second wheel, and G, H, and I are spatial coordinates of a third wheel, X is a spatial coordinate (e.g., an x-coordinate) of the potentially out-of-plane wheel and Y is another spatial coordinate (e.g., a y-coordinate) of the potentially out-of-plane wheel. The local bump compensator 316 thus calculates the estimated height (e.g., Z) using the other three wheels of the vehicle to develop a reference plane. When the measured height is different from the estimated height by a predetermined threshold amount (e.g., one standard deviation), the wheel is identified as out-of-plane. In such an example, if the measured height is greater than the estimated height (e.g., Z in Equation 5), the wheel is determined to be on a bump or other raised surface, while the wheel is determined to be in a pothole or other lowered surface when the measured height is lower than the estimated height. To compensate for the state of the wheel (e.g., raised or lowered), the local bump compensator 316 incorporates previous wheel height values into the relationship developed by the weight calculator 204. In some examples, the local bump compensator 316 determines an importance of past estimated height values to use (e.g., by utilizing a regressive Kalman filter to assign importance to past estimated height values).

The load sharing compensator 304 of the illustrated example includes an example solid axle compensator 318, an example anti-roll bar compensator 320, and an example tie rod link compensator 322. In operation, the load sharing compensator 304 compensates for how a load is distributed between wheels (e.g., the example wheels 104-110 of FIG. 1) of the vehicle 102. For example, when the vehicle 102 is loaded asymmetrically (e.g., more weight loaded on one side than another side of the vehicle 102), a solid axle, an anti-roll bar, a tie-rod link, and/or other vehicle components transfer a load from a more heavily loaded side to a less heavily loaded side. Due to the load transfer through these components, the suspension is not compressed by the load, leading to an inaccuracy in the relationship of ride height in weight that is compensated for by the load sharing compensator 304. In some examples, the load sharing compensator 304 uses build parameters associated with a make and model of the vehicle 102 to determine one or more compensation factors.

The solid axle compensator 318 calculates a compensation factor based on load transfer characteristics of a solid axle (e.g., of a front or rear suspension) of the vehicle 102. For example, the solid axle compensator 318 determines the load sharing characteristics between the front wheels of the vehicle 102 based on characteristics of the solid axle of the front suspension and calculates a compensation factor based on these characteristics. The anti-roll bar compensator 320 evaluates a load that is transferred from one wheel to another wheel (e.g., from the left front wheel 104 to the front right wheel 106) via an anti-roll bar and calculates a compensation value based on vehicle roll-related distribution effects of the anti-roll bar of the vehicle 102. A detailed description of the anti-roll bar compensator 320 can be found in connection with U.S. Patent Application No. 62/665,340. The tie rod link compensator 322 calculates a compensation factor based on characteristics of a tie rod link of the steering system of the vehicle 102. For example, the tie rod link affects the load sharing characteristics of the front wheels, and the tie rod link compensator 322 calculates a compensation factor that accounts for this load sharing. In some examples, the solid axle compensator 318, the anti-roll bar of the vehicle 102, and/or the tie rod link compensator 322 use an equation such as Equation 6 below to calculate their respective compensation factor:

$$\text{Weight}_{FL,corr} = \text{Weight}_{FL} + c^*(\text{Weight}_{FL} - \text{Weight}_{FR}) + V_{roll} \qquad \text{(Equation 6)}$$

where $\text{Weight}_{FL,corr}$ is a corrected weight at a wheel-end associated with the front left wheel, $\text{Weight}_{FL}$ is a weight at the front left wheel-end using an equation developed by the weight calculator 204, $\text{Weight}_{FR}$ is a weight at the front left wheel-end using the equation developed by the weight calculator 204, c and $V_{roll}$ are coefficients dependent on suspension components characteristics (e.g., dependent on characteristics of a solid axle, anti-roll bar, or tie rod links of the suspension). In some examples, the coefficient c is dependent on build parameters and, therefore, is dependent on a make and model of the vehicle 102. Using Equation 6, the load sharing compensator 304 can calculate a compensation factor based on the load sharing characteristics of the suspension of the vehicle 102.

The vehicle state compensator 306 of the illustrated example includes an example steering angle compensator 324, an example parking brake compensator 326, an example fuel level compensator 328, and an example tire pressure compensator 330. In operation, the vehicle state compensator 306 compensates for characteristics of a make and model of the vehicle 102 (e.g., the compensators 324-330 are consistent for a make and model of a vehicle). In some examples, the characteristics utilized by the vehicle state compensator 306 are included in the build parameters. In some examples, the steering angle compensator 324, the parking brake compensator 326, the fuel level compensator 328, and the tire pressure compensator 330 calculate separate compensation factors. Additionally or alternatively, the steering angle compensator 324, the parking brake compensator 326, the fuel level compensator 328, and the tire pressure compensator 330 are combined to calculate one or more compensation factors.

The steering angle compensator 324 uses steering angle data (e.g., from a steering angle sensor) to calculate a compensation factor by determining the effect of various steering angles on the ride height to weight relationship. Such effects are determined, in some examples, prior to use of the vehicle 102 by a driver and are based on a make and model of the vehicle 102. The steering angle compensator 324 calculates a compensation factor that compensates for changes in steering angle of the vehicle 102 during operation. Similarly, the tire pressure compensator 330 uses tire pressure data (e.g., from a tire pressure monitoring system (TPMS) of the vehicle 102) to calculate a compensation factor that accounts for changes in tire pressure during operation of the vehicle 102. The compensation factor is based on an effect of tire pressure on the relationship of ride height and weight and is dependent on the make and model of the vehicle 102.

The parking brake compensator 326 calculates a compensation factor in a similar manner to the steering angle compensator 324 and/or the tire pressure compensator 330. The parking brake compensator 326 determines how a parking brake state (e.g., a position of the parking brake) affects the relationship developed by the weight calculator 204 and determines a compensation factor to account for the parking brake state. The fuel level compensator 328 determines a compensation factor based on a level of fuel in the vehicle based on a predetermined influence of the fuel level on the ride height to weight relationship.

In some examples, the steering angle compensator 324 the parking brake compensator 326, the fuel level compensator 328, and the tire pressure compensator 330 calculate their respective compensation factors based on an equation. For example, Equation 7 can be used for any compensators included in the vehicle state compensators 306 to adjust the relationship between weight and ride height:

$$\text{Weight} = m^*(\text{rideheight} + h) + b + k \quad \text{(Equation 7)}$$

where m and b are coefficients used in the original relationship between weight and ride height developed by the weight calculator 204, rideheight is the ride height at a wheel-end of the vehicle 102, and h and k are coefficients developed empirically through testing of one or more of the steering angle, parking brake position, fuel level, and/or tire pressure. Additionally or alternatively, the steering angle compensator 324 the parking brake compensator 326, the fuel level compensator 328, and the tire pressure compensator 330 can calculate their respective compensation factors based on a look-up table.

The environmental compensator 308 of the illustrated example includes an example temperature compensator 332 and an example humidity compensator 334. In some examples, the environmental compensator 308 compensates for conditions outside of the vehicle, such as weather conditions. For example, the temperature compensator 332 uses a known influence of temperature on suspension to provide a compensation value to be applied to the relationship developed by the weight calculator 204. In some examples, ambient temperature changes a compliance of suspension components (e.g., a stiffness of the suspension). In such examples, the temperature compensator 332 calculates a compensation factor based on temperature to account for the changes in suspension component compliance. For example, Equation 8 below can be used by the temperature compensator 332 to adjust the relationship of ride height and weight based on temperature:

$$\text{Weight}_{FL,corr} = \text{Weight}_{FL} + (T_a^* A^*(T_1)(\text{rideheight}_{FL})^1 - T_a^* B^*)(T_2)(\text{rideheight}_{FL})^0) T_3 \quad \text{(Equation 8)}$$

where $\text{Weight}_{FL,corr}$ is a corrected weight at a wheel-end associated with the front left wheel, $\text{Weight}_{FL}$ is a weight at the front left wheel-end using an equation developed by the weight calculator 204, $\text{rideheight}_{FL}$ is a ride height at the front left wheel-end of the vehicle 102, $T_a$ is ambient temperature, A, B, $T_1$, $T_2$, and $T_3$ are coefficients determined by the temperature compensator 332 based on the effects of temperature on the suspension. Similarly, the humidity compensator 334 calculates a compensation factor based on the effect of humidity on the vehicle suspension. In some examples, the humidity compensator 334 calculates the compensation factor based on an influence of the humidity on the relationship of ride height and vehicle weight (e.g., due to changes in suspension compliance due to humidity). In some examples, the humidity compensator 334 uses an equation similar to Equation 8 to calculate a compensation factor. In some examples, the environmental compensator 308 can compensate for other weather conditions.

The vehicle lifecycle compensator 310 of the illustrated example includes an example linear age compensator 336, an example cycle count compensator 338, and an example prognostic compensator 340. In some examples, the vehicle lifecycle compensator 310 adjusts the relationship developed by the weight calculator 204 based on age and wear on the vehicle 102. In the illustrated example, the vehicle lifecycle compensator 310 calculates a single compensation factor that combines information from the linear age compensator 336, the cycle count compensator 338, and/or the prognostic compensator 340.

The linear age compensator 336 calculates a compensation factor component based on age of the vehicle 102 (e.g., time calculated from a first ignition start to present time). For example, over time components of the suspension (e.g., springs, bushings, etc.) will experience a decrease in rate (e.g., spring rate, bushing rate, etc.), creating a change in the ride height to weight relationship. Thus, the linear age compensator 336 calculates a component compensation factor (e.g., a component of the vehicle lifecycle compensation factor) that counteracts the change in the suspension components over time.

The cycle count compensator 338 calculates a compensation factor component based on a number of cycles of the vehicle suspension (e.g., a number of discrete oscillations of the suspension observed by the ride height sensors). For example, a higher cycle count indicates higher usage of the vehicle 102 and, accordingly, more wear on the vehicle 102. The cycle count compensator 338 calculates a component compensation factor that accounts for the influence of wear on the vehicle 102 in the ride height to weight relationship. The prognostic compensator 340 determines a severity of the vehicle cycles (e.g., based on an amplitude of the suspension oscillations observed by the ride height sensors) and uses the severity information to calculate a component compensation factor for the vehicle lifecycle compensation factor. Using the output from the linear age compensator 336, the cycle count compensator 338, and/or the prognostic compensator 340, the vehicle lifecycle compensator 310 adjusts the relationship of ride height and weight of the vehicle 102 to account for the age of the vehicle 102, as well as the wear on the vehicle 102. For example, Equation 9 below can be used by the vehicle lifecycle compensator 310 to adjust the relationship developed by the weight calculator 204:

$$\text{Weight} = m^*(\text{rideheight} + i(r,s,t)) + b + j(r,s,t)$$

where m and b are coefficients used in the relationship developed by the weight calculator 204, rideheight is a ride height measured at a wheel-end of the vehicle 102, r is a cycle count (e.g., a number of oscillations), s is a severity of the cycles (e.g., an amplitude of the oscillations), t is a vehicle lifetime (e.g., a time from first ignition to present time), and i(r,s,t) and j(r,s,t) are components of an adjustment to the relationship. The cycle count, severity, and vehicle age are used to develop coefficients applied to the relationship of the weight calculator to adjust the relationship for age of the vehicle 102 and an amount of wear on the vehicle 102. Additionally or alternatively, Equation 9 can include greater or fewer components While an example manner of implementing the controller 112 of FIG. 1 is illustrated in FIG. 2, one or more of the elements, processes and/or devices illustrated in FIG. 2 may be combined, divided, re-arranged, omitted, eliminated and/or implemented in any other way. Further, the example sensor interface 202, the example weight calculator 204, the example compensation calculator 206, the example calculation adjustor 208, the example display interface 210, the example instruction generator 212, the example driving surface compensator 302, the example load sharing compensator 304, the example vehicle state compensator 306, the example environmental compensator 308, the example vehicle lifecycle compensator 310, the example contact grade compensator 312, the example contact roll compensator 314, the example local bump compensator 316, the example solid axle compensator 318, the example anti-roll bar compensator 320, the example tie rod link compensator 322, the example steering angle compensator 324, the example parking brake compensator 326, the example fuel level compensator 328, the example tire pressure compensator 330, the example temperature compensator 332, the example humidity compensator 334, the example linear age compensator 336, the example cycle count compensator 338, the example prognostic compensator 340, and/or, more generally, the example controller 112 of FIG. 2 may be implemented by hardware, software, firmware and/or any combination of hardware, software and/or firmware. Thus, for example, any of the example sensor interface 202, the example weight calculator 204, the example compensation calculator 206, the example calculation adjustor 208, the example display interface 210, the example instruction generator 212, the example driving surface compensator 302, the example load sharing compensator 304, the example vehicle state compensator 306, the example environmental compensator 308, the example vehicle lifecycle compensator 310, the example contact grade compensator 312, the example contact roll compensator 314, the example local bump compensator 316, the example solid axle compensator 318, the example anti-roll bar compensator 320, the example tie rod link compensator 322, the example steering angle compensator 324, the example parking brake compensator 326, the example fuel level compensator 328, the example tire pressure compensator 330, the example temperature compensator 332, the example humidity compensator 334, the example linear age compensator 336, the example cycle count compensator 338, the example prognostic compensator 340, and/or, more generally, the example controller 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example weight calculator 204, the example compensation calculator 206, the example calculation adjustor 208, the example display interface 210, the example instruction generator 212, the example driving surface compensator 302, the example load sharing compensator 304, the example vehicle state compensator 306, the example environmental compensator 308, the example vehicle lifecycle compensator 310, the example contact grade compensator 312, the example contact roll compensator 314, the example local bump compensator 316, the example solid axle compensator 318, the example anti-roll bar compensator 320, the example tie rod link compensator 322, the example steering angle compensator 324, the example parking brake compensator 326, the example fuel level compensator 328, the example tire pressure compensator 330, the example temperature compensator 332, the example humidity compensator 334, the example linear age compensator 336, the example cycle count compensator 338, the example prognostic compensator 340, and/or the example controller 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 112 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
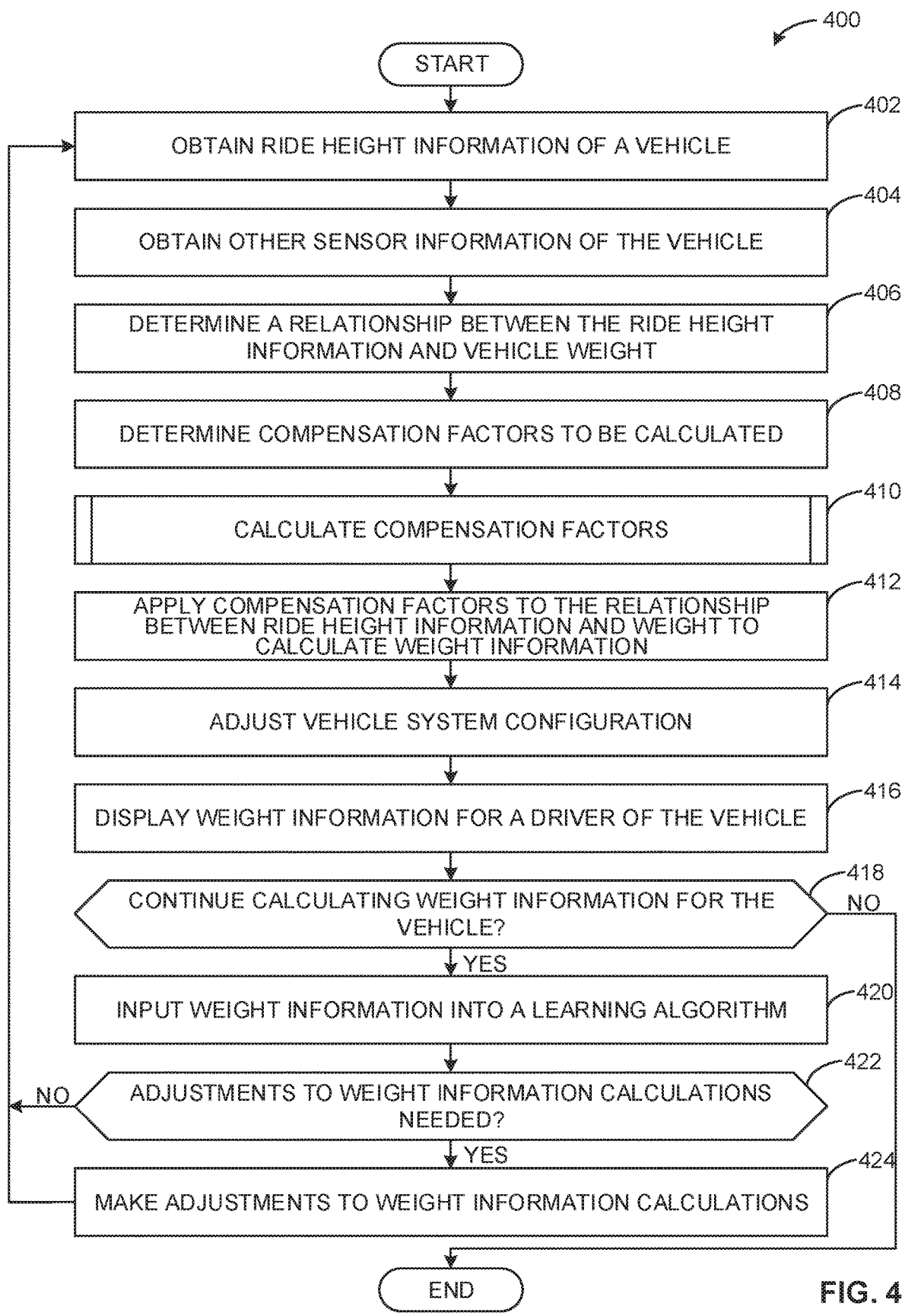
FIG. 4 is a flowchart representative of machine readable instructions that may be executed to implement the example controller of FIGS. 1 and/or 2 to calculate vehicle weight information.
Figure 5:
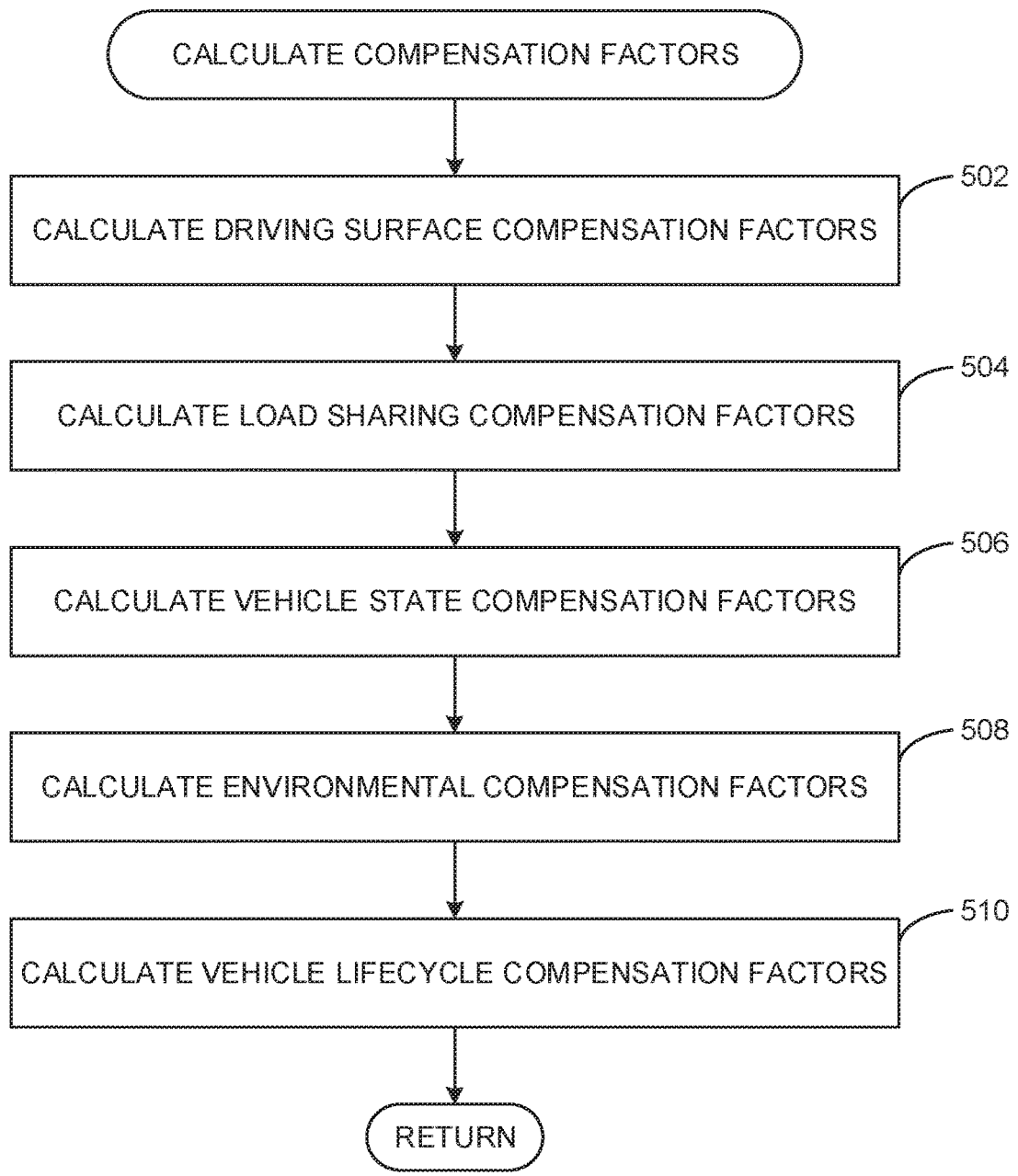
FIG. 5 is a flowchart representative of machine readable instructions that may be executed to implement the example compensation calculator of FIGS. 2 and/or 3 to calculate compensation factors.

Flowcharts representative of example hardware logic, machine readable instructions, hardware implemented state machines, and/or any combination thereof for implementing the controller 112 of FIGS. 1 and/or 2 is shown in FIGS. 4-5. The machine readable instructions may be an executable program or portion of an executable program for execution by a computer processor such as the processor 612 shown in the example processor platform 600 discussed below in connection with FIG. 6. The programs may be embodied in software stored on a non-transitory computer readable storage medium such as a CD-ROM, a floppy disk, a hard drive, a DVD, a Blu-ray disk, or a memory associated with the processor 612, but the entire programs and/or parts thereof could alternatively be executed by a device other than the processor 612 and/or embodied in firmware or dedicated hardware. Further, although the example programs are described with reference to the flowcharts illustrated in FIGS. 4-5, many other methods of implementing the example controller 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 4 is a flowchart representative of machine readable instructions that may be executed to implement the example controller 112 of FIGS. 1 and/or 2 to calculate vehicle weight and vehicle weight distribution information. The example program 400 begins at block 402, where the controller 112 obtains ride height information of a vehicle (e.g., the vehicle 102 of FIG. 1). For example, the sensor interface 202 of FIG. 2 is communicatively coupled to the examples sensors 114 of FIGS. 1 and/or 2 to receive ride height information from ride height sensors associated with wheel-ends of the vehicle 102.

At block 404, the controller 112 obtains other sensor information of the vehicle 102. For example, the sensor interface 202 is further communicatively coupled to the example vehicle CAN bus 116 of FIGS. 1 and/or 2. The sensor interface 202 receives sensor data from the vehicle CAN bus 116 related to other systems of the vehicle 102. In some examples, the sensor interface 202 receives sensor information from sensors within a steering system of the vehicle 102, a powertrain system of the vehicle 102, an engine of the vehicle 102, and/or any other system of the vehicle 102. In some examples, the vehicle CAN bus 116 includes sensor information indicative of factors external to the vehicle 102 (e.g., temperature, humidity, etc.).

The controller 112 is further to determine a relationship between the ride height information and vehicle weight (block 406). For example, the weight calculator 204 of FIG. 1 develops a relationship between ride height and weight using a component-level approach or a vehicle-level approach, as discussed in connection with FIG. 1. In some examples, the weight calculator 204 uses build parameters of the vehicle 102 (e.g., parameters dependent on a make and model of the vehicle 102) to determine the relationship between ride height and weight.

At block 408, the controller 112 determines compensation factors that are to be calculated. For example, the compensation calculator 206 of FIG. 1 determines compensation factors that are to be applied to the relationship developed by the weight calculator 204 to make the weight information more accurate. For example, the compensation calculator 206 can determine that, factors such as vehicle state factors, environmental factors, etc., are to be accounted for in the compensation calculations. In some examples, the compensation calculator 206 determines that all of the possible compensation factors (e.g., as discussed in connection with FIG. 3) are to be used in the compensation calculations.

The controller 112 further calculates the compensation factors (block 410). For example, the compensation calculator 206 calculates the compensation values for each of the compensation factors selected at block 408. Individual compensation factors are discussed in more detail in connection with FIG. 5.

At block 412, the controller 112 applies the compensation factors to the relationship between ride height information and weight to calculate weight information. For example, when the compensation calculator 206 has calculated the compensation factors, the compensation calculator 206 can apply the compensation factors to the relationship between ride height information and weight output by the weight calculator 204. In some examples, the compensation calculator 206 combines (e.g., by multiplication, addition, etc.) the compensation factors (e.g., as coefficients) by an equation representing the relationship. In some such examples, when the compensation factors have been input into the equation (e.g., as coefficients), a weight associated with each of the wheel-ends of the vehicle 102 is calculated. The weight associated with each wheel-end of the vehicle 102 is further used to generate the weight information. In some examples, the weight information includes total vehicle weight, front axle weight, rear axle weight, cargo weight, passenger weight, fuel weight, wheel-end force, trailer coupler weight, and/or trailer weight.

The controller 112 further adjusts a vehicle system configuration (block 414). For example, the instruction generator 212 of FIG. 2 instructs other systems of the vehicle 102 (e.g., transmission, cruise control, anti-lock braking system (ABS), etc.) to make adjustments based on the weight information. In some examples, the instruction generator 212 instructs the ABS to adjust a braking force applied to wheels of the vehicle 102. In some other examples, the instruction generator 212 instructs the transmission of the vehicle 102 to adjust the shift points (e.g., a flywheel rpm at which the transmission shifts gears).

At block 416, the controller 112 displays the weight information to a driver of the vehicle 102. For example, the compensation calculator 206, after applying the compensation factors to the relationship developed by the weight calculator 204 to calculate weight information, can transmit the weight information to the example display interface 210 of FIG. 2. The display interface 210 is communicatively coupled to the example vehicle display 118 of FIGS. 1 and/or 2, outputs the weight information to the vehicle display 118. The driver of the vehicle 102 can thus view the weight information on the vehicle display 118. In some examples, the driver can interact with the vehicle display 118 (e.g., via a user interface) to display additional or different information, respond to alerts, or use the vehicle display 118 for any other purpose.

At block 418, the controller 112 determines whether to continue calculating weight information for the vehicle 102. For example, when the weight information has been calculated and output to a driver of the vehicle 102, the controller determines whether further weight information calculations should be performed (e.g., whether the vehicle 102 is still in operation, whether the driver determines the program 400 is to conclude, etc.). When the controller 112 determines that further weight information calculations are to be performed, control of program 400 proceeds to block 420. On the other hand, when the controller 112 determines that no more weight information calculations are to be performed, the program 400 concludes.

When the controller 112 determines that further weight information calculations are to be performed, the controller 112 inputs weight information into a learning algorithm (block 420). For example, the weight information is input into the example calculation adjustor 208 of FIG. 2 to determine whether changes to the weight information calculations (e.g., blocks 406 to 412) are to be made.

At block 422, the controller 112 determines whether adjustments to the weight information calculations are needed. For example, the calculation adjustor 208 can compare the weight information received from the compensation calculator 206 to weight estimations from other systems of the vehicle 102. In some examples, the powertrain calculates a dynamic mass estimation of the weight of the vehicle 102. Additionally or alternatively, other systems of the vehicle 102 can calculate a weight estimation (e.g., the anti-lock braking system (ABS), etc.). Given the comparison between the weight information calculated by the weight calculator 204 and/or the compensation calculator 206, the calculation adjustor 208 can determine whether adjustments to either the weight calculator 204 and/or the compensation calculator 206 would yield more accurate weight information. Additionally or alternatively, the calculation adjustor 208 can determine whether adjustments are needed based on driver behavior (e.g., frequent off-road driving, frequent towing with vehicle 102, etc.) and/or vehicle degradation (e.g., high mileage over short time periods). When the controller 112 determines that adjustments to the weight information calculations are needed, control of program 400 proceeds to block 424. If the controller 112 determines that no adjustments are necessary (e.g., the weight information does not vary substantially from the weight estimation of another vehicle system), control of program 400 returns to block 402 where the controller 112 obtains ride height information of the vehicle 102.

The controller 112 further makes adjustments to the weight information calculations (block 424). For example, the calculation adjustor 208 can instruct the compensation calculator 206 to weight specific compensation factors more heavily (e.g., based on driver behavior) or adjust the calculations of the weight calculator 204 (e.g., the relationship of ride height and weight developed by the component-level or vehicle-level approach). The adjustments made by the calculation adjustor 208 are then used during subsequent calculations performed by the weight calculator 204 and/or the compensation calculator 206. When the controller 112 has made adjustments to the weight information calculations, control of the program 400 returns to block 402 where the controller 112 obtains ride height information of the vehicle 102.

FIG. 5 is a flowchart representative of machine readable instructions that may be executed to implement the example compensation calculator 206 of FIGS. 2 and/or 3 to calculate compensation factors. The compensation calculator 206 is included within the example controller 112 of FIGS. 1 and/or 2. The example program 410 of FIG. 5 begins at block 502 where the compensation calculator calculates driving surface compensation factors. For example, the example driving surface compensator 302 of FIG. 3 calculates compensation factors based on conditions of a driving surface (e.g., a road) that a vehicle (e.g., the vehicle 102 of FIG. 1) is on (e.g., parked on). In some examples, the driving surface compensator 302 compensates for a grade of the driving surface (e.g., with the contact grade compensator 312 of FIG. 3), an uneven driving surface from one side of the vehicle 102 to the other side of the vehicle 102 (e.g., with the contact roll compensator 314 of FIG. 3), and/or bumps (e.g., a curb) or pitfalls (e.g., a pothole) in the driving surface (e.g., with the local bump compensator 316 of FIG. 3). In some examples, the driving surface compensation factors are based on data from one or more accelerometers (e.g., a pitch accelerometer, a roll accelerometer, etc.) and/or ride height sensors.

At block 504, the compensation calculator 206 calculates load sharing compensation factors. For example, the load sharing compensator 304 of FIG. 3 calculates compensation factors based on how a load is distributed between wheels of the vehicle 102 (e.g., load distributed between left and right sides of a front and/or rear suspension, load distribution between front and rear suspensions, etc.). In some examples, the load sharing compensator 304 compensates for effects of a solid axle of the vehicle 102 on load sharing (e.g., with the solid axle compensator 318 of FIG. 3), effects of an anti-roll bar of the vehicle 102 on load sharing (e.g., with the anti-roll bar compensator 320 of FIG. 3), and/or effects of a tie rod of the vehicle 102 on load sharing (e.g., with the tie rod link compensator 322 of FIG. 3). In some examples, the load sharing compensation factors are calculated based on build parameters related to a make and model of the vehicle 102.

The compensation calculator 206 further calculates vehicle state compensation factors (block 506). For example, the vehicle state compensator 306 of FIG. 3 accounts for current characteristics of the vehicle 102. In some examples, the vehicle state compensator 306 compensates for the effects of steering angle (e.g., with the steering angle compensator 324 of FIG. 3), a parking brake position (e.g., with the parking brake compensator 326 of FIG. 3), fuel level (e.g., with the fuel level compensator 328 of FIG. 3), and/or tire pressure of the wheels 104-110 of FIG. 1 (e.g., with the tire pressure compensator 330 of FIG. 3). In some examples, the vehicle state compensation factors are based on data from one or more on-board vehicle sensors (e.g., a steering angle sensor, a tire pressure sensor, etc.).

At block 508, the compensation calculator 206 calculates environmental compensation factors. For example, the example environmental compensator 308 of FIG. 3 determines the effects of environmental conditions (e.g., weather conditions) on weight calculations and calculates compensation factors for these environmental conditions. In some examples, the environmental compensator 308 compensates for the effects of temperature (e.g., with the temperature compensator 332 of FIG. 3) and/or humidity (e.g., with the humidity compensator 334 of FIG. 3) on suspension components (e.g., changes in stiffness of suspension components, etc.). In some examples, the environmental compensation factors are based on sensors of the vehicle (e.g., a temperature sensor, a humidity sensor, etc.).

The compensation calculator 206 further calculates vehicle lifecycle compensation factors (block 510). For example, the vehicle lifecycle compensator 310 of FIG. 3 calculates compensation factors based on age and wear of the vehicle 102. In some examples, the vehicle lifecycle compensator 310 compensates for the effects of linear age of the vehicle 102 (e.g., with the linear age compensator 336 of FIG. 3), a cycle count of the vehicle 102 (e.g., with the cycle count compensator 338 of FIG. 3), and/or vehicle prognostics (e.g., with the prognostic compensator 340 of FIG. 3). In some examples, the vehicle lifecycle compensation factors are based on information from ride height sensors (e.g., a number and/or amplitude of oscillations of a suspension). For example, the vehicle lifecycle compensation factors are based on cycle count (e.g., the number of suspension oscillations) and a severity of the cycles (e.g., based on the amplitude of suspension oscillations). When the compensation calculator 206 has calculated the vehicle lifecycle compensation factor, program 410 concludes and control returns to block 412 of FIG. 4.

Figure 6:
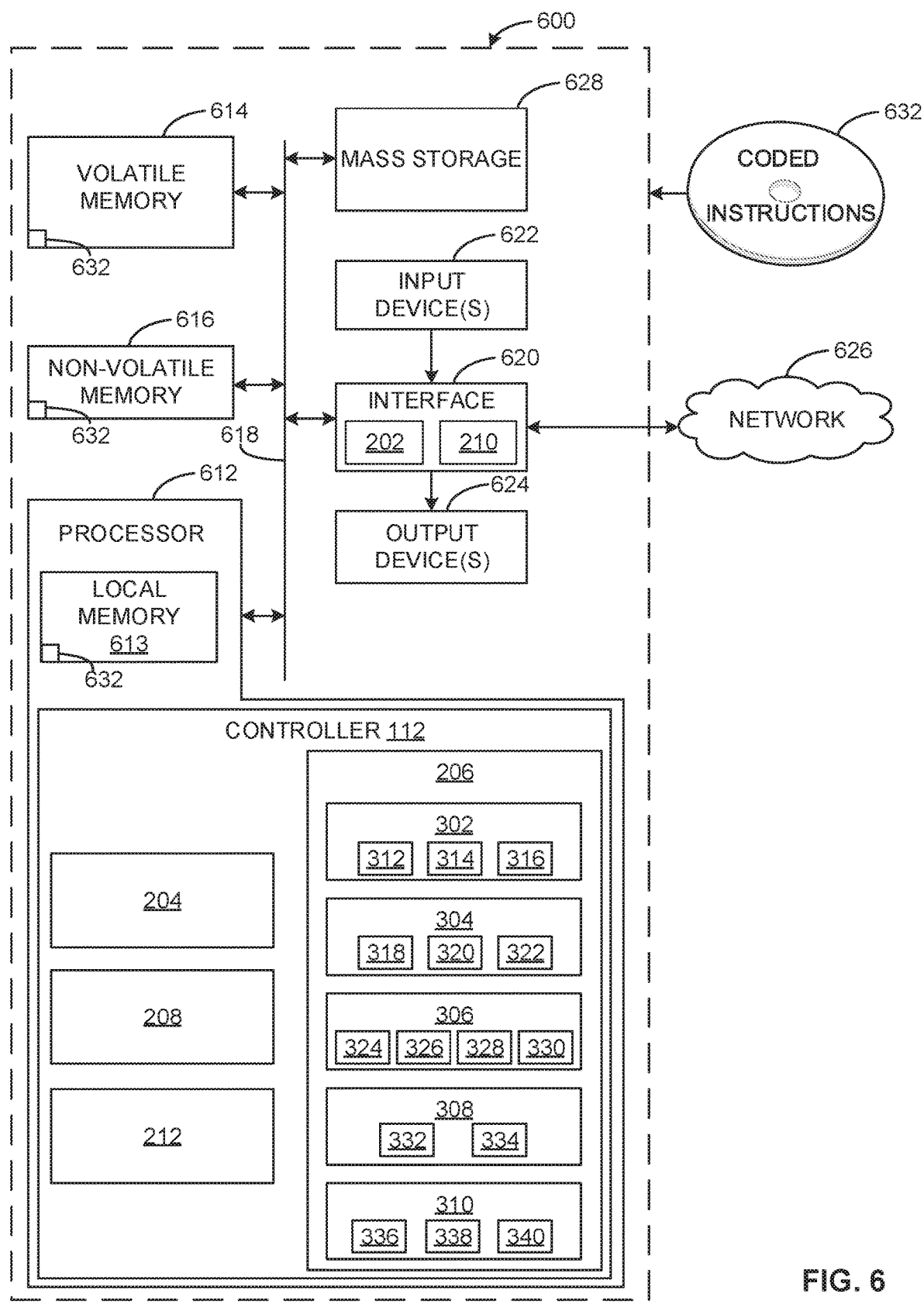
FIG. 6 is a block diagram of an example processing platform structured to execute the instructions of FIGS. 4-5 to implement the example controller 112 of FIGS. 1 and/or 2.

FIG. 6 is a block diagram of an example processor platform 600 structured to execute the instructions of FIGS. 4-5 to implement the controller 112 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device.

In this example, the processor implements the example controller 112, the example weight calculator 204, the example compensation calculator 206, the example calculation adjustor 208, the example instruction generator 212, the example driving surface compensator 302, the example load sharing compensator 304, the example vehicle state compensator 306, the example environmental compensator 308, the example vehicle lifecycle compensator 310, the example contact grade compensator 312, the example contact roll compensator 314, the example local bump compensator 316, the example solid axle compensator 318, the example anti-roll bar compensator 320, the example tie rod link compensator 322, the example steering angle compensator 324, the example parking brake compensator 326, the example fuel level compensator 328, the example tire pressure compensator 330, the example temperature compensator 332, the example humidity compensator 334, the example linear age compensator 336, the example cycle count compensator 338, and the example prognostic compensator 340.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface. The interface circuit 620 of the illustrated example includes the example sensor interface 202 and the example display interface 210 of FIG. 2.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that calculate weight information for a vehicle based on ride height information. The examples disclosed herein further compensate for changes to the vehicle (e.g., changes in suspension components), and/or external factors (e.g., temperature, driving surface conditions, etc.) using build parameters of the vehicle (e.g., characteristics of the vehicle dependent on a make and/or model of the vehicle) and/or sensor data from sensors already utilized by the vehicle. The compensation factors account for changes based on driving situations (e.g., driving surface conditions) and/or changes that occur over time (e.g., aging and/or degradation of a suspension). These adjustments provide accurate weight information to a driver because the variations in the original weight information calculations are offset by the compensation factors, eliminating the adverse effects these variations would have on the weight information calculations.

Further, the examples disclosed herein constantly improve the weight information calculations and the compensation factor calculations through analysis of weight information results compared to weight estimations generated by other vehicle systems (e.g., a powertrain), driver behavior, and/or degradation of the vehicle over time. Accordingly, the methods and apparatus disclosed herein continue to improve the accuracy of the weight information throughout the lifetime of the vehicle. Thus, a driver of the vehicle is able to view updated weight information regarding the vehicle to determine, for example, an amount of cargo that can be carried, a rate at which cargo and/or materials are being removed from the vehicle, and how weight (e.g., cargo) can be distributed most effectively in the vehicle. Further, the weight information can be used to generate instructions that are transmitted to other systems of the vehicle (e.g., a transmission, cruise control, anti-lock braking system, etc.). Such instructions can make adjustments to these vehicle systems to adjust parameters (e.g., a braking force, transmission shift points, etc.) based on the weight information associated with the vehicle.

Example 1 includes an apparatus comprising a weight calculator to determine a relationship between ride height information and weight of a vehicle, a compensation calculator to adjust the relationship based on compensation factors and calculate vehicle weight information for the vehicle based on the adjusted relationship, the compensation factors based on vehicle sensor data, and a calculation adjustor to adjust the vehicle weight information calculation of the weight calculator or the compensation calculator based on driver behavior.

Example 2 includes the apparatus of example 1, wherein the vehicle weight information includes passenger weight, fuel weight, wheel-end force, or trailer coupler weight.

Example 3 includes the apparatus of example 1, wherein the vehicle weight information includes total vehicle weight, weight distribution, front axle weight, rear axle weight, cargo weight, or trailer weight.

Example 4 includes the apparatus of example 1, wherein driver behavior includes driving surfaces a driver frequently drives on, tasks the driver frequently uses the vehicle for, or weather conditions the driver subjects the vehicle to.

Example 5 includes the apparatus of example 1, wherein the compensation factors include vehicle state factors based on steering angle information, parking brake information, fuel level information, or tire pressure information.

Example 6 includes the apparatus of example 1, wherein the compensation factors include vehicle lifecycle factors based on vehicle linear age information, cycle count information, or prognostic information.

Example 7 includes the apparatus of example 1, wherein the weight calculator further determines the relationship between ride height and weight based on build parameters including vehicle characteristics specific to the vehicle.

Example 8 includes the apparatus of example 1, further including a vehicle display to display the weight information to a driver of the vehicle.

Example 9 includes a method comprising determining a relationship between ride height information and weight of a vehicle, adjusting the relationship based on compensation factors, the compensation factors based on vehicle sensor data, calculating vehicle weight information for the vehicle based on the adjusted relationship, and adjusting the vehicle weight information calculation based on driver behavior.

Example 10 includes the method of example 9, wherein the vehicle weight information includes passenger weight, fuel weight, wheel-end force, or trailer coupler weight.

Example 11 includes the method of example 9, wherein the vehicle weight information includes total vehicle weight, weight distribution, front axle weight, rear axle weight, cargo weight, or trailer weight.

Example 12 includes the method of example 9, wherein the compensation factors include driving surface factors, vehicle load sharing factors, or environmental factors.

Example 13 includes the method of example 9, wherein the compensation factors include vehicle lifecycle factors based on vehicle linear age information, cycle count information, or prognostic information.

Example 14 includes the method of example 13, wherein the relationship is adjusted based on driver behavior by increasing a value of the vehicle lifecycle compensation factor when the driver frequently tows a trailer.

Example 15 includes a tangible computer readable storage medium comprising instructions that, when executed, cause a machine to at least determine a relationship between ride height information and weight of a vehicle, adjust the relationship based on compensation factors, the compensation factors based on vehicle sensor data calculate vehicle weight information for the vehicle based on the adjusted relationship, and adjust the vehicle weight information calculation based on driver behavior.

Example 16 includes the tangible computer readable storage medium of example 15, wherein the vehicle weight information includes passenger weight, fuel weight, wheel-end force, or trailer coupler weight.

Example 17 includes the tangible computer readable storage medium of example 15, wherein the vehicle weight information includes total vehicle weight, weight distribution, front axle weight, rear axle weight, cargo weight, or trailer weight.

Example 18 includes the tangible computer readable storage medium of example 15, wherein the compensation factors include driving surface factors, vehicle load sharing factors, or environmental factors.

Example 19 includes the tangible computer readable storage medium of example 15, wherein the compensation factors include vehicle state factors based on steering angle information, parking brake information, fuel level information, or tire pressure information.

Example 20 includes the tangible computer readable storage medium of example 15, wherein the compensation factors include vehicle lifecycle factors based on vehicle linear age information, cycle count information, or prognostic information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a weight calculator to determine a relationship between ride height information and weight of a vehicle, the weight calculator to determine a height distribution across the vehicle from ride height sensors;
   a compensation calculator to adjust the relationship based on compensation factors and calculate a vehicle weight distribution for the vehicle based on the adjusted relationship, the compensation factors based on vehicle sensor data, the weight distribution corresponding to weights across the vehicle; and
   a calculation adjustor to adjust the vehicle weight distribution calculation based on the height distribution and driver behavior corresponding to historical data associated with use of the vehicle by a driver, the weight calculator, the compensation calculator, and the calculation adjustor implemented by one or more logic circuits.

2. The apparatus of claim 1, wherein the vehicle weight distribution includes at least one of passenger weight, fuel weight, wheel-end force, or trailer coupler weight.

3. The apparatus of claim 1, wherein the vehicle weight distribution includes at least one of total vehicle weight, front axle weight, rear axle weight, cargo weight, or trailer weight.

4. The apparatus of claim 1, wherein driver behavior includes at least one of driving surfaces a driver frequently drives on, tasks the driver frequently uses the vehicle for, or weather conditions the driver subjects the vehicle to.

5. The apparatus of claim 1, wherein the compensation factors include at least one of vehicle state compensation factors based on steering angle information, parking brake information, fuel level information, or tire pressure information.

6. The apparatus of claim 1, wherein the compensation factors include vehicle lifecycle compensation factors based on at least one of vehicle linear age information, cycle count information, or prognostic information.

7. The apparatus of claim 1, wherein the weight calculator further determines the relationship between ride height and weight based on build parameters including vehicle characteristics specific to the vehicle.

8. The apparatus of claim 1, further including a vehicle display to display the vehicle weight information to a driver of the vehicle.

9. A method comprising:
determining a height distribution across a vehicle from ride height sensors;
determining a relationship between the height distribution and weight of a vehicle;
adjusting the relationship based on compensation factors, the compensation factors based on vehicle sensor data;
calculating a vehicle weight distribution for the vehicle based on the adjusted relationship, the weight distribution corresponding to weights across the vehicle; and
adjusting the vehicle weight distribution calculation based on driving behavior corresponding to historical data associated with use of the vehicle by a driver.

10. The method of claim 9, wherein the vehicle weight distribution includes at least one of passenger weight, fuel weight, wheel-end force, or trailer coupler weight.

11. The method of claim 9, wherein the vehicle weight distribution includes at least one of total vehicle weight front axle weight, rear axle weight, cargo weight, or trailer weight.

12. The method of claim 9, wherein the compensation factors include at least one of driving surface compensation factors, vehicle load sharing compensation factors, or environmental compensation factors.

13. The method of claim 9, wherein the compensation factors include vehicle lifecycle compensation factors based on at least one of vehicle linear age information, cycle count information, or prognostic information.

14. The method of claim 13, wherein the weight distribution calculation is adjusted based on driver behavior by increasing a value of the vehicle lifecycle compensation factor when a driver frequently tows a trailer.

15. A tangible computer readable storage medium comprising instructions that, when executed, cause a machine to at least:
determine a height distribution across a vehicle from ride height sensors;
determine a relationship between the ride-height distribution information and weight of a vehicle;
adjust the relationship based on compensation factors, the compensation factors based on vehicle sensor data;
calculate a vehicle weight distribution for the vehicle based on the adjusted relationship, the weight distribution corresponding to weights across the vehicle; and
adjust the vehicle weight distribution calculation based on historical data associated with use of the vehicle by a driver.

16. The tangible computer readable storage medium of claim 15, wherein the vehicle weight distribution includes passenger weight, fuel weight, wheel-end force, or trailer coupler weight.

17. The tangible computer readable storage medium of claim 15, wherein the vehicle weight distribution includes total vehicle weight, front axle weight, rear axle weight, cargo weight, or trailer weight.

18. The tangible computer readable storage medium of claim 15, wherein the compensation factors include at least one of driving surface compensation factors, vehicle load sharing compensation factors, or environmental compensation factors.

19. The tangible computer readable storage medium of claim 15, wherein the compensation factors include vehicle state compensation factors based on at least one of steering angle information, parking brake information, fuel level information, or tire pressure information.

20. The tangible computer readable storage medium of claim 15, wherein the compensation factors include vehicle lifecycle compensation factors based on at least one of vehicle linear age information, cycle count information, or prognostic information.

21. The apparatus of claim 7, wherein the vehicle characteristics correspond to a production configuration of the vehicle.

* * * * *